(12) United States Patent
Savant

(10) Patent No.: US 9,844,225 B2
(45) Date of Patent: Dec. 19, 2017

(54) JELLY CONFECTIONERY PRODUCTS HAVING A STABILIZER AND A FIBER BLEND

(75) Inventor: Vivek Dilip Savant, Norton Shores, MI (US)

(73) Assignee: Nestec S.A., Vevey (CH)

( * ) Notice: Subject to any disclaimer, the term of this patent is extended or adjusted under 35 U.S.C. 154(b) by 808 days.

(21) Appl. No.: 13/989,106

(22) PCT Filed: Nov. 23, 2010

(86) PCT No.: PCT/US2010/057826
§ 371 (c)(1),
(2), (4) Date: Aug. 13, 2013

(87) PCT Pub. No.: WO2012/071035
PCT Pub. Date: May 31, 2012

(65) Prior Publication Data
US 2014/0050837 A1    Feb. 20, 2014

(51) Int. Cl.
| | | |
|---|---|---|
| A23G 3/42 | (2006.01) |
| A23G 3/38 | (2006.01) |
| A23L 29/20 | (2016.01) |
| A23L 21/18 | (2016.01) |
| A23L 33/135 | (2016.01) |
| A23L 33/21 | (2016.01) |
| A23G 3/50 | (2006.01) |
| A23G 3/44 | (2006.01) |
| A23P 30/10 | (2016.01) |
| A23L 29/212 | (2016.01) |
| A23L 29/231 | (2016.01) |
| A23L 29/238 | (2016.01) |
| A23L 29/256 | (2016.01) |
| A23L 29/269 | (2016.01) |

(52) U.S. Cl.
CPC .............. *A23G 3/42* (2013.01); *A23G 3/38* (2013.01); *A23L 21/18* (2016.08); *A23L 29/20* (2016.08); *A23L 33/135* (2016.08); *A23L 33/21* (2016.08); *A23G 3/44* (2013.01); *A23G 3/50* (2013.01); *A23L 29/212* (2016.08); *A23L 29/231* (2016.08); *A23L 29/238* (2016.08); *A23L 29/256* (2016.08); *A23L 29/272* (2016.08); *A23P 30/10* (2016.08)

(58) Field of Classification Search
CPC ... A23G 3/42; A23G 3/44; A23G 3/48; A23G 3/50; A23G 3/343; A23G 1/54; A23L 29/238; A23L 29/272; A23L 21/18; A23L 29/30
USPC .......................................... 426/573, 575–578
See application file for complete search history.

(56) References Cited

U.S. PATENT DOCUMENTS

2010/0119664 A1 * 5/2010 Stawski .................. A23G 3/42
426/103

FOREIGN PATENT DOCUMENTS

| | | |
|---|---|---|
| GB | 1284729 | 8/1972 |
| JP | 60192556 | 3/1984 |
| JP | 01016563 | 1/1989 |
| JP | 2003061592 A * | 3/2003 |

OTHER PUBLICATIONS

Nternational Search Report and the Written Opinion dated Aug. 17, 2011, received in PCT Application No. PCT/US2010/057826.

* cited by examiner

*Primary Examiner* — Jyoti Chawla
(74) *Attorney, Agent, or Firm* — Gary M. Lobel, Esq.

(57) ABSTRACT

Jelly confectionery products and methods of producing the jelly confectionery products are provided. In a general embodiment, the present disclosure provides a jelly confectionery product having 1) an ingredient including fruit juice, fruit puree or a combination thereof, and 2) a jelly blend including a stabilizer and a fiber. The jelly confectionery product can be free of added sugar or corn syrup.

4 Claims, No Drawings

JELLY CONFECTIONERY PRODUCTS HAVING A STABILIZER AND A FIBER BLEND

BACKGROUND

The present disclosure relates generally to confectionery products. More specifically, the present disclosure relates to jelly confectionery products having a jelly blend including a stabilizer and a fiber.

There are numerous types of confectionery products. Such confectionery products can include, for instance, hard or chewy candy. It is generally known that providing confectionery products having unique flavors and health benefits can lead to enhanced marketability with consumers. Jelly beans and gummy bears are a common sugar-based jellied confectionery. Typically, these sugar-based jellied confectionery include a food stabilizer such as carrageenan that is conventionally standardized with sugars such as dextrose. However, the use of dextrose is disadvantageous for making reduced sugar or sugar-free confectionery products.

SUMMARY OF THE INVENTION

The present disclosure is directed to jelly confectionery products including a stabilizer/fiber blend and methods of producing these confectionery products. In a general embodiment, the present disclosure provides a jelly confectionery product having 1) an ingredient including fruit juice, fruit puree or a combination thereof, and 2) a jelly blend including a stabilizer ranging from about 10% to about 90% by weight of the blend and a fiber ranging from about 10% to about 90% by weight of the blend. In any embodiments of the jelly confectionery product described herein, the jelly confectionery product can be free of added sugar or corn syrup.

In any embodiments of the jelly confectionery product described herein, the fiber can range from about 1% to about 15% by weight of the jelly confectionery product. In another embodiment, the fiber ranges from about 4% to about 7% by weight of the jelly confectionery product.

In any embodiments of the jelly confectionery product described herein, the stabilizer can be, for example, carrageenan, pectin, alginate, gelatin, agar, gellan gum, xanthan gum, cellulose gum, gum arabic, modified starch or a combination thereof.

In any embodiments of the jelly confectionery product described herein, the fiber can be, for example, cellulose, inulin, mannooligosaccharide, acacia gum, guar gum, microcrystalline cellulose, polydextrose, dextrin, fructooligosaccharide, carboxymethyl cellulose or a combination thereof.

In any embodiments of the jelly confectionery product described herein, the jelly confectionery product can further include a sugarless sweetener such as, for example, erythritol, sorbitol, maltitol, isomalt, mannitol, xylitol or a combination thereof.

In any embodiments of the jelly confectionery product described herein, the jelly confectionery product can further include at least one ingredient such as, for example, flavors, colors, spices, acids, actives or a combination thereof.

In another embodiment, the present disclosure provides a jelly blend including from about 10% to about 90% by weight of a stabilizer and from about 10% to about 90% by weight of a fiber. The jelly blend can be free of added sugar or corn syrup.

In any embodiments of the jelly blend described herein, the stabilizer can be, for example, carrageenan, pectin, alginate, gelatin, agar, gellan gum, xanthan gum, cellulose gum, gum arabic, modified starch or a combination thereof.

In any embodiments of the jelly blend described herein, the fiber can be, for example, cellulose, inulin, mannooligosaccharide, acacia gum, guar gum, microcrystalline cellulose, polydextrose, dextrin, fructooligosaccharide, carboxymethyl cellulose or a combination thereof.

In another embodiment, the present disclosure provides a method of making a jelly confectionery product. The method comprises preparing a jelly candy mixture including 1) an ingredient including fruit juice, fruit puree or a combination thereof, and 2) a jelly blend including a stabilizer ranging from about 10% to about 90% by weight of the blend and a fiber ranging from about 10% to about 90% by weight of the blend. The method further comprises forming the jelly candy mixture in a mold to produce the jelly confectionery product. The method can include adding at least one ingredient such as, for example, flavors, colors, spices, acids, actives or a combination thereof to the jelly candy mixture before forming. The jelly confectionery product can be made free of added sugar or corn syrup.

In any embodiments of the methods described herein, the fiber can range from about 1% to about 15% by weight of the jelly confectionery product. In another embodiment, the fiber can range from about 4% to about 7% by weight of the jelly confectionery product.

In any embodiments of the methods described herein, the stabilizer can be, for example, carrageenan, pectin, alginate, gelatin, agar, gellan gum, xanthan gum, cellulose gum, gum arabic, modified starch or a combination thereof.

In any embodiments of the methods described herein, the fiber can be, for example, cellulose, inulin, mannooligosaccharide, acacia gum, guar gum, microcrystalline cellulose, polydextrose, dextrin, fructooligosaccharide, carboxymethyl cellulose or a combination thereof.

An advantage of the present disclosure is to provide an improved jelly confectionery product free of added sugar or corn syrup.

Another advantage of the present disclosure is to provide an improved jelly confectionery product providing health benefits with respect to fiber.

Yet another advantage of the present disclosure is to provide an improved process for making jelly confectionery products free of added sugar or corn syrup.

Additional features and advantages are described herein, and will be apparent from, the following Detailed Description.

DETAILED DESCRIPTION

The present disclosure relates to jelly confectionery products and methods for producing the jelly confectionery products. When making confectionery products, stabilizers are typically standardized using sugar (e.g., dextrose). It has surprisingly been found that the use of a fiber in combination with a stabilizer not only allows sugar to be replaced as a standardizing agent, but also provides a beneficial dietary element to a confectionery product. The stabilizer/fiber blend can be used to produce beneficial jelly confectionary products that can be free of added sugar or corn syrup.

As used herein, the term "jelly confectionery product" means that the jelly confectionery product comprises a hydrocolloid or gel-based confectionery as understood by the skilled artisan.

As used herein, the term "stabilizer" means a processing aid that is used in food applications for various functional purposes such as (a) gelling (b) thickening and indirectly (c) emulsifying. Stabilizers maintain the physico-chemical state of food matrices enabling the maintenance of a homogenous dispersion of two or more immiscible substances.

As used herein, the phrase "free of added sugar or corn syrup" means being completely free of or having a substantially reduced amount (i.e., less than 1% by weight) of added sugar and/or corn syrup. It should be noted, however, that the jelly confectionery product may contain sugar or other simple carbohydrates from the fruit juice and/or fruit puree, as natural components of the fruits.

In a general embodiment, the present disclosure provides a jelly blend including a stabilizer and a fiber that can be standardized without sugar or corn syrup. For example, the jelly blend can include from about 10% to about 90% by weight of a stabilizer and from about 10% to about 90% by weight of a fiber.

In any embodiments of the jelly blends described herein, the amount of stabilizer in the jelly blend can range between about 10% to about 90% by weight including about 15%, 20%, 25%, 30%, 35%, 40%, 45%, 50%, 55%, 60%, 65%, 70%, 75%, 80%, 85% by weight and the like. It should be appreciated that any two amounts of the stabilizer can further represent end points in a preferred range of the stabilizer in the jelly blend. For example, the amounts of 15% and 25% by weight can represent the individual amounts of the stabilizer in the jelly blend as well as a preferred range of the stabilizer between about 15% and about 25% by weight of the jelly blend. In an embodiment, the amount of stabilizer in the jelly blend can range between about 10% to about 30% by weight.

In any embodiments of the jelly blends described herein, the amount of fiber in the jelly blend can range between about 10% to about 90% by weight including about 15%, 20%, 25%, 30%, 35%, 40%, 45%, 50%, 55%, 60%, 65%, 70%, 75%, 80%, 85% by weight and the like. It should be appreciated that any two amounts of the fiber can further represent end points in a preferred range of the fiber in the jelly blend. For example, the amounts of 73% and 86% by weight can represent the individual amounts of the fiber in the jelly blend as well as a preferred range of the fiber between about 73% and about 86% by weight of the jelly blend. In an embodiment, the amount of fiber in the jelly blend can range between about 70% to about 90% by weight.

In any embodiments of the jelly blend described herein, the stabilizer can be, for example, carrageenan, pectin, alginate, gelatin, agar, gellan gum, xanthan gum, cellulose gum, gum arabic, modified starch or a combination thereof. In preferred embodiments of the jelly blend described herein, the stabilizer can be, for example, carrageenan, pectin, alginate, gelatin, modified starch or a combination thereof. In any embodiments of the jelly blend described herein, the fiber can be, for example, cellulose, inulin, mannooligosaccharide, acacia gum, guar gum, microcrystalline cellulose, polydextrose, dextrin, fructooligosaccharide, carboxymethyl cellulose or a combination thereof. In preferred embodiments of the jelly blend described herein, the fiber can be, for example, cellulose, inulin, mannooligosaccharide, microcrystalline cellulose, fructooligosaccharide or a combination thereof.

In another general embodiment, the present disclosure provides a jelly confectionery product having 1) an ingredient including fruit juice, fruit puree or a combination thereof, and 2) a jelly blend including a stabilizer ranging from about 10% to about 90% by weight of the blend and a fiber ranging from about 10% to about 90% by weight of the blend. It should be appreciated that the fruit juice can be provided as fruit juice concentrate. In any embodiments of the jelly confectionery product described herein, the jelly confectionery product can be free of added sugar or corn syrup.

In any embodiments of the jelly confectionery product described herein, the amount of fiber in the jelly confectionery product can range from about 1% to about 15% by weight of the jelly confectionery product. For instance, the amount of fiber in the jelly confectionery product can range between about 1% to about 15% by weight including about 2%, 3%, 4%, 5%, 6%, 7%, 8%, 9%, 10%, 11%, 12%, 13%, 14% by weight and the like. It should be appreciated that any two amounts of the fiber can further represent end points in a preferred range of the fiber in the jelly confectionery product. For example, the amounts of 4% and 7% by weight can represent the individual amounts of the fiber in the jelly confectionery product as well as a preferred range of the fiber between about 4% and about 7% by weight of the jelly confectionery product. It should be further appreciated that, depending on the fruit ingredient, fiber may also come from the fruit ingredient. However, this source of fibers is marginal over the fibers from the jelly blend.

In any embodiments of the jelly confectionery product described herein, the stabilizer can be, for example, carrageenan, pectin, alginate, gelatin, agar, gellan gum, xanthan gum, cellulose gum, gum arabic, modified starch or a combination thereof. In preferred embodiments of the jelly confectionery product described herein, the stabilizer can be, for example, carrageenan, pectin, alginate, gelatin, modified starch or a combination thereof. In any embodiments of the jelly confectionery product described herein, the fiber can be, for example, cellulose, inulin, mannooligosaccharide, acacia gum, guar gum, microcrystalline cellulose, polydextrose, dextrin, fructooligosaccharide, carboxymethyl cellulose or a combination thereof. In preferred embodiments of the jelly confectionery product described herein, the fiber can be, for example, cellulose, inulin, mannooligosaccharide, microcrystalline cellulose, fructooligosaccharide or a combination thereof. Any other stabilizers or fibers can be used in accordance with embodiments of the present disclosure.

In any embodiments of the jelly confectionery product described herein, the jelly confectionery product can further include a sugarless sweetener such as, for example, erythritol, sorbitol, maltitol, isomalt, mannitol, xylitol or a combination thereof. In any embodiments of the jelly confectionery product described herein, the jelly confectionery product can further include one or more confectionery ingredients such as, for example, flavors, colors, spices, acids, actives or a combination thereof described in more detail below.

It should be appreciated that the one or more ingredients such as flavors, colors, spices, acids (e.g., food grade acids such as ascorbic acid, citric acid) and/or actives (e.g., listed below) can go in the jelly confectionery product in a free form in any suitable amount. The ingredients can also be added in the form of encapsulation, compaction, granulation and agglomeration to provide, for example, protected and longer-lasting ingredient components such as flavors. It should also be appreciated that the jelly confectionery products can comprise any suitable number and combinations of the flavors, acids and/or actives.

In addition to the fruit juice or fruit puree, any additional flavorants or flavors used in the jelly confectionery products may include any natural or synthetic oil and/or flavor as is commonly known in the art. Natural and artificial flavoring agents may be combined in any sensorially acceptable fashion. The flavor agents can be used in any suitable amount in the jelly confectionery products.

Nonlimiting examples of suitable flavorants include natural and synthetic flavoring agents chosen from synthetic flavor oils and flavoring aromatics, and/or oils, oleo resins and extracts derived from plants, leaves, flowers, fruits, vegetables and so forth, and combinations thereof. Nonlimiting examples of flavor oils include spearmint oil, cinnamon oil, oil of wintergreen (methyl salicylate), peppermint oils, clove oil, bay oil, anise oil, eucalyptus oil, thyme oil, cedar leaf oil, oil of nutmeg, oil of sage, oil of bitter almonds, and cassia oil. Also nonlimiting examples of artificial, natural or synthetic fruit flavors include vanilla, cream, caramel, banana, cocoa, and citrus oil, including lemon, orange, grape, lime and grapefruit and fruit essences including apple, pear, peach, strawberry, raspberry, cherry, plum, pineapple, apricot and so forth. Flavors may also include any suitable pastes, powders and extracts of fruits or vegetables.

It is understood that these flavorants may be used alone or in combination with or without a sensate such as, for example, a cooling or heating agent as is commonly known in the art. The flavorant or flavor may be encapsulated or non-encapsulated. Encapsulated flavorant may be used to increase or decrease the flavor release rate as is commonly known in the art.

Spices can be any one or more fresh, dried or extracted seeds, fruits, roots, barks, or vegetative substances used in nutritionally insignificant quantities as a jelly confectionery product additive to add flavor, color, or as a preservative that kills harmful bacteria or prevents their growth. As used herein, spices can also include herbs, which are leafy, green plant parts used for flavoring.

Generally, actives may include, inter alia, anti-oxidants, vitamins, minerals, stimulants, prebiotics, probiotics, enzymes, genetically modified organisms, nutritional supplements, yoghurt ingredients and whitening ingredients. Generally, medicaments may include, inter alia, analgesics, antibiotics, antivirals, antihistamines, anti-inflammatories, decongestants, antacids, muscle relaxants, psychotherapeutic agents, insulin, diuretics, anesthetics, antitussives, antidiabetic agents, bioengineered pharmaceuticals, nutraceuticals, traditional medicines and cardiovascular agents. It is envisioned, that depending on the medicament, the resultant product can be used to treat, inter alia: coughs, colds, motion sickness, allergies, fevers, pain, inflammation, sore throats, cold sores, sinus problems, diarrhea, diabetics, gastritis, depression, anxiety, hypertension, angina, and other maladies and symptoms.

Specific actives may include, by way of example and not limitation: b-glucan, isoflavones, omega-3 fatty acid, lignans, lycopene, allicin, glucosinolates, limonoids, fructose and a nondialyzable polymeric compound, polyphenols, catechins (e.g. epigallocatechin-3-gallate, epigallocatechin, epicatechin-3-gallate, epicatechin), phenolics, polyunsaturated fatty acids (PUFAs such as omega-3 (n-3) fatty acids), soy protein, soy isolates, conjugated linoleic acid (CLA), caffeine, aspirin, nicotine, echinacea purpurea, ginseng, kola nut, capsicum, nettle, passion flower, St. Johns Wort, valerian, Ma Huang/guarana, kava kava and chamomile.

Vitamins may include Vitamins A, B-complex (such as B-1, B-2, B-6 and B-12), C, D, E and K, niacin and acid vitamins such as pantothenic acid and folic acid and biotin. Minerals may include calcium, iron, zinc, magnesium, iodine, copper, phosphorus, manganese, potassium, chromium, molybdenum, selenium, nickel, tin, silicon, vanadium and boron.

The jelly confectionery product can be packaged individually or bulk. For instance, a pouch may contain the equivalent of one serving (from about 15 g to about 35 g of jelly confectionery product), and several single-serving pouches may be packed together. Provided the jelly confectionery product is free of added sugar and corn syrup, the package may bear a message such as "No added sugar" and the like. Depending on the amount of fibers in the jelly confectionery product, the package may also bear a message such as "Contains fibers" and the like. In an embodiment, one serving of the jelly confectionery product contains at least 2 g of fibers, and more preferably at least 4 g of fibers. For instance, jelly confectionery products containing 7% by weight of fibers, with a serving size of 28 g, can be marked as "Contains fibers".

In another embodiment, the present disclosure provides a method of making a jelly confectionery product. The method comprises preparing a jelly candy mixture including 1) an ingredient including fruit juice, fruit puree or a combination thereof, and 2) a jelly blend including a stabilizer ranging from about 10% to about 90% by weight of the blend and a fiber ranging from about 10% to about 90% by weight of the blend. The method can also include adding one or more ingredients such as, for example, flavors, colors, spices, acids, actives or a combination thereof to the jelly candy mixture before forming. The jelly confectionery product can be made free of added sugar or corn syrup.

The fruit juice and/or fruit puree along with any other ingredients such as flavors, colors, spices, acids, actives or a combination thereof can be mixed together and heated to form a slurry. It should be appreciated that the fruit juice can be provided as fruit juice concentrate. It should be appreciated that the additional ingredients can be added at any suitable stage of the mixing process. The slurry can be deposited into one or more starch molds and dried to produce the jelly confectionery product. The molded, jelly confectionery products can then be removed from the molds and packaged separately or together.

Alternatively, the jelly candy mixture can be formed by any suitable laminating, extruding or depositing processes. The jelly confectionery products in embodiments of the present disclosure can be formed into any suitable size or shape such as, for example, a pellet, sphere, cube, cigarette, spiral, etc. The jelly confectionery products can have any suitable thickness.

In any embodiments of the methods described herein, the fiber can range from about 1% to about 15% by weight of the jelly confectionery product. In another embodiment, the fiber can range from about 4% to about 7% by weight of the jelly confectionery product.

In any embodiments of the methods described herein, the stabilizer can be, for example, carrageenan, pectin, alginate, gelatin, agar, gellan gum, xanthan gum, cellulose gum, gum arabic, modified starch or a combination thereof. In preferred embodiments of the methods described herein, the stabilizer can be, for example, carrageenan, pectin, alginate, gelatin, modified starch or a combination thereof. In any embodiments of the methods described herein, the fiber can be, for example, cellulose, inulin, mannooligosaccharide, acacia gum, guar gum, microcrystalline cellulose, polydextrose, dextrin, fructooligosaccharide, carboxymethyl cellulose or a combination thereof. In preferred embodiments of the methods described herein, the fiber can be, for example, cellulose, inulin, mannooligosaccharide, microcrystalline cellulose, fructooligosaccharide or a combination thereof.

EXAMPLES

By way of example and not limitation, the following examples are illustrative of various embodiments of the present disclosure.

Jelly blend: A jelly blend can prepared that contains 20-80% by weight carrageenan (DG 6611, without dextrose, FMC BioPolymers) as the stabilizer and 20-80% by weight microcrystalline cellulose (Avicel LM-310, FMC BioPolymers) as the fiber. The jelly blends are used in formulations 1 and 2 below to prepare jelly confectionery products without added sugar and which contain fibers.

Fruit ingredients can be supplied from Tree Top (Selah, Wash.). Natural colors can be selected from Red cabbage extract, Annatto, Paprika, Elderberry juice concentrate. Other ingredients are staple ingredients and can be supplied from ingredient suppliers as foodgrade standard.

Jelly confectionery: the fruit ingredients are mixed and cooked together with the jelly blend, ascorbic acid, sodium citrate and water, in a batch mixer under heating to a temperature of 123° C., and under vacuum, to form a slurry having a total solids content of about 72%. The remaining ingredients are mixed into the slurry. The slurry is then dosed into fruit-shaped starch molds. The dosed slurry is then dried at about 50° C. during 18 hours to a total solid content of about 81%, then cooled during 4 hours to a temperature of about 27° C. The dried jelly confectionery products are then glazed with Capol in a tumbling tank. Finally, the jelly confectionery products are packed in single-serving pouches. A 28 grams serving of jelly confectionery products can contain about 10 to 20 pieces.

Formulation 1 (1.5% jelly blend)—A slurry is prepared as described above with 87% white grape juice, 7% apple puree, 1.5% jelly blend (20% MCC and 80% carrageenan), 0.75% pectin, 0.4% sodium citrate, 0.7% ascorbic acid, and 0.7% citric acid. 1.4 parts by weight of natural flavors and less than 0.5 parts by weight of natural colors are then added to 100 parts by weight of slurry.

Formulation 2 (6% jelly blend)—A slurry is prepared as described above with 87% white grape juice, 6% apple puree, 6% jelly blend (80% MCC and 20% carrageenan), 0.4% sodium citrate, 0.7% ascorbic acid and 0.7% citric acid. 1.4 parts by weight of natural flavors and less than 0.5 parts by weight of natural colors are then added to 100 parts by weight of slurry.

Jelly confectionery products prepared with formulation 1 and formulation 2 contain respectively 0.003% and 4.5% fiber by weight. These products can be marked as "No added sugar". Formulation 2 can also be marked as "Contains fibers".

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is as follows:

1. A jelly confectionery product comprising:
   an ingredient selected from the group consisting of fruit juice, fruit puree and combinations thereof; and
   a jelly blend consisting of:
      a stabilizer ranging from about 20% to about 80% by weight of the jelly blend, wherein the stabilizer is carrageenan; and
      a fiber ranging from about 20% to about 80% by weight of the jelly blend, wherein the fiber is present in an amount from about 1% to about 15% by weight of the jelly confectionery product, and wherein the fiber is microcrystalline cellulose; and
   wherein the jelly confectionery product is free of added sugar or corn syrup.

2. The jelly confectionery product of claim 1, wherein the fiber comprises from about 4% to about 7% by weight of the jelly confectionery product.

3. The jelly confectionery product of claim 1, wherein the jelly confectionery product comprises at least one ingredient selected from the group consisting of flavors, colors, spices, acids, actives and combinations thereof.

4. The jelly confectionery product of claim 1, wherein the fiber comprises from about 1% to about 4.5% by weight of the jelly confectionery product.

* * * * *